US008101285B2

(12) United States Patent
Mitose et al.

(10) Patent No.: US 8,101,285 B2
(45) Date of Patent: Jan. 24, 2012

(54) METALLIC MATERIAL FOR A CONNECTING PART AND A METHOD OF PRODUCING THE SAME

(75) Inventors: Kengo Mitose, Tokyo (JP); Shuichi Kitagawa, Tokyo (JP); Yoshiaki Ogiwara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/893,630

(22) Filed: Sep. 29, 2010

(65) Prior Publication Data

US 2011/0020664 A1 Jan. 27, 2011

Related U.S. Application Data

(63) Continuation of application No. PCT/JP2009/056574, filed on Mar. 30, 2009.

(30) Foreign Application Priority Data

Mar. 31, 2008 (JP) ................................. 2008-092053
Mar. 31, 2008 (JP) ................................. 2008-092054

(51) Int. Cl.

*H01R 13/03* (2006.01)
*B32B 15/20* (2006.01)
*C25D 5/50* (2006.01)
*C25D 7/00* (2006.01)

(52) U.S. Cl. ........ 428/607; 428/647; 428/648; 428/675; 428/676; 428/929; 148/536; 148/537; 148/518; 439/886; 205/170; 205/226; 205/228; 427/376.8; 427/405

(58) Field of Classification Search ........................ None
See application file for complete search history.

(56) References Cited

U.S. PATENT DOCUMENTS

| | | | | |
|---|---|---|---|---|
| 5,045,410 | A * | 9/1991 | Hiesbock et al. | 428/644 |
| 2005/0037229 | A1 * | 2/2005 | Tanaka | 428/647 |
| 2005/0211461 | A1 * | 9/2005 | Horikoshi et al. | 174/117 FF |
| 2007/0218590 | A1 * | 9/2007 | Kameyama | 438/123 |
| 2007/0235207 | A1 * | 10/2007 | Tsuji et al. | 174/68.1 |
| 2007/0243405 | A1 * | 10/2007 | Ogawa | 428/647 |
| 2007/0297937 | A1 * | 12/2007 | Miura | 420/560 |

(Continued)

FOREIGN PATENT DOCUMENTS

JP 8-176883 A 7/1996

(Continued)

OTHER PUBLICATIONS

English machine translation of JP 11-350188, Dec. 1999.*

(Continued)

*Primary Examiner* — John J Zimmerman
(74) *Attorney, Agent, or Firm* — Birch, Stewart, Kolasch & Birch, LLP

(57) ABSTRACT

A metallic material for a connecting part, having a rectangular wire material of copper or a copper alloy as a base material, and formed at an outermost surface thereof, a copper-tin alloy layer substantially composed of copper and tin, wherein the copper-tin alloy layer of the outermost surface further contains at least one selected from the group consisting of zinc, indium, antimony, gallium, lead, bismuth, cadmium, magnesium, silver, gold, and aluminum, in a total amount of 0.01% or more and 1% or less in terms of mass ratio with respect to the content of the tin.

20 Claims, 3 Drawing Sheets

U.S. PATENT DOCUMENTS

| | | | | |
|---|---|---|---|---|
| 2008/0169020 | A1* | 7/2008 | Shiomi et al. | 136/252 |
| 2009/0239398 | A1* | 9/2009 | Lynch et al. | 439/81 |
| 2009/0255710 | A1* | 10/2009 | Nishi et al. | 174/126.1 |

FOREIGN PATENT DOCUMENTS

| | | | |
|---|---|---|---|
| JP | 10-102283 | A | 4/1998 |
| JP | 11-350188 | A | 12/1999 |
| JP | 11-350189 | A | 12/1999 |
| JP | 2001-172791 | A | 6/2001 |
| JP | 2002-80993 | A | 3/2002 |
| JP | 2003-105589 | A | 4/2003 |
| JP | 2005-2368 | A | 1/2005 |
| JP | 2005-105307 | A | 4/2005 |
| JP | 2006-77307 | A | 3/2006 |
| JP | 2007-231407 | A | 9/2007 |

OTHER PUBLICATIONS

International Search Report dated Jul. 7, 2009, for PCT/JP2009/056574.

* cited by examiner

[Fig. 1]
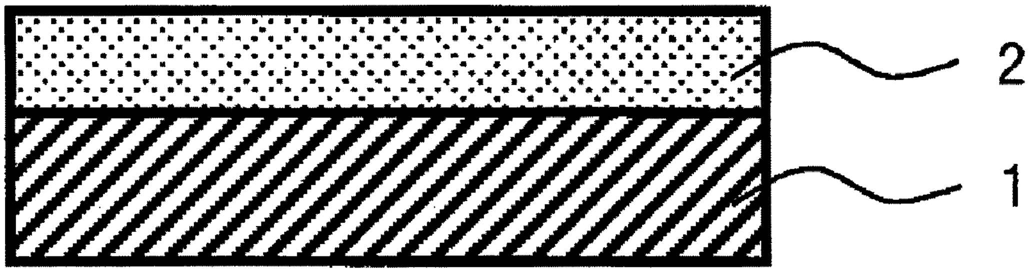
[Fig. 2]
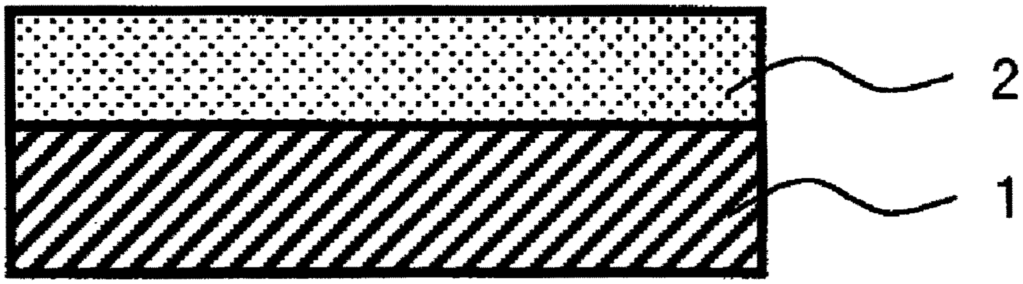
[Fig. 3]
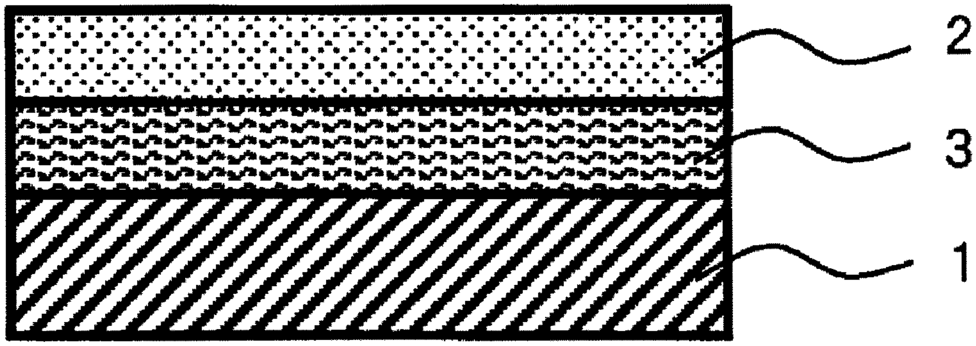

[Fig. 4]
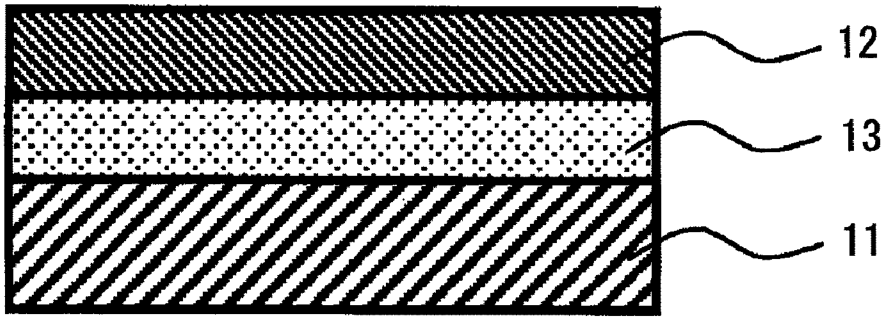
[Fig. 5]
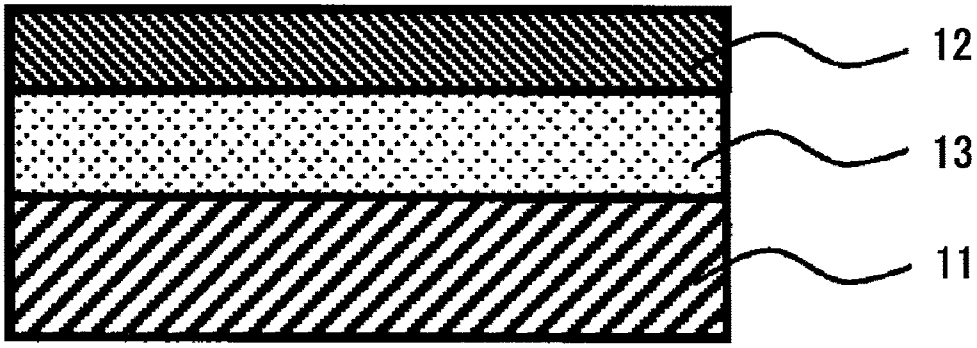
[Fig. 6]
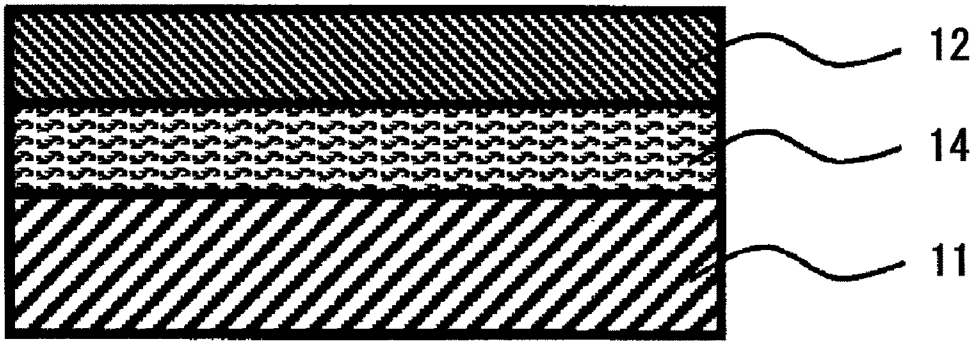

[Fig. 7]
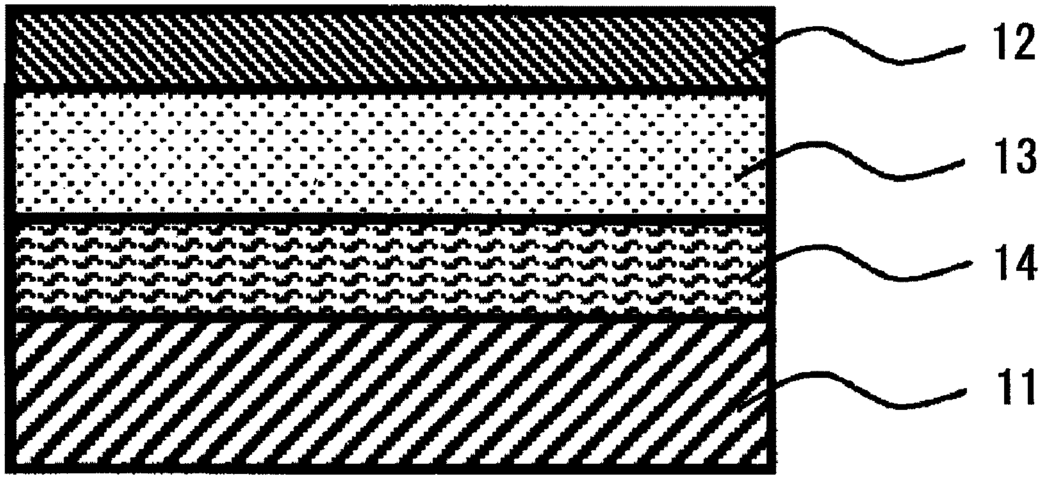

METALLIC MATERIAL FOR A CONNECTING PART AND A METHOD OF PRODUCING THE SAME

CROSS REFERENCE TO RELATED APPLICATIONS

This application is a Continuation of PCT International Application No. PCT/JP2009/056574 filed on Mar. 30, 2009, which claims priority under 35 U.S.C. 119(a) to Patent Application Nos. 2008-092053 and 2008-092054 filed in Japan on Mar. 31, 2008, all of which are hereby expressly incorporated by reference into the present application.

TECHNICAL FIELD

The present invention relates to a metallic material for a connecting part and a method for producing the same, and more particularly, the present invention relates to a metallic material for a connecting part having sufficient gloss after a reflow, and a method for producing the same.

BACKGROUND ART

A plated material produced by providing a plating layer of, for example, tin (Sn) or a tin alloy, on an electroconductive base material, such as copper (Cu) or a copper alloy (hereinafter, appropriately referred to as base material), is known as a high performance conductor material having the excellent electroconductivity and mechanical strength of the base material, as well as the excellent electrical connectivity, corrosion resistance, and solderability of the plating layer. Thus, such plated materials are widely used in various terminals, connectors, and the like.

In recent years, since a fitting-type connector is multipolarized with advancement of electronic control, a considerable force is necessary for plugging a group of male terminals into/out of a group of female terminals. In particular, plugging-in/out such a connector is difficult in a narrow space such as the engine room of a vehicle, and it has been strongly demanded to reduce the force for plugging in/out such a connector.

In order to reduce the plugging-in/out force, the Sn plating layer on the surface of the connector terminal may be thinned to weaken contact pressure between the terminals. However, because the Sn plating layer is soft, a fretting phenomenon may occur between contact faces of the terminals, thereby causing inferior conduction between the terminals.

In the fretting phenomenon, the soft Sn plating layer on the surface of the terminal wears and is oxidized, becoming abrasion powder having large specific resistance, due to fine vibration between the contact faces of the terminals caused by vibration and changes in temperature. When this phenomenon occurs between the terminals, conduction between the terminals results in inferior. The lower the contact pressure between the terminals, the more the fretting phenomenon is apt to occur.

Patent Literature 1 describes an electrically conductive material for a connecting part, having a Cu—Sn alloy coating layer and a Sn coating layer, formed in this order, on the surface of a base material formed from a Cu strip, wherein the Cu—Sn alloy coating layer has the exposure area ratio at the material surface of 3 to 75%, the average thickness of 0.1 to 3.0 μm, and the Cu content of 20 to 70 at %; and the Sn or Sn alloy coating layer has the average thickness of 0.2 to 5.0 μm. It is also described that a Cu—Sn alloy coating layer is formed by performing a reflow treatment.

According to Patent Literature 1, when this electrically conductive material is used in, for example, a multipole connector in automobiles, a low insertion force upon fitting of male and female terminals is attained, and the assembly operation can be efficiently carried out; and the electrically conductive material is considered to be able to maintain electrical reliability (low contact resistance), even if maintained for a long period of time under a high temperature atmosphere, or even under a corrosive environment.

Patent Literature 1: JP-A-2006-77307 ("JP-A" means unexamined published Japanese patent application)

DISCLOSURE OF INVENTION

Technical Problem

However, although the electrically conductive material for a connecting part described above has a base material formed from a Cu strip, when the base material is a rectangular wire material, the surface properties after heat treatment can be deteriorated at the time of the production of a Cu—Sn alloy plated wire or the production of a Sn plated wire, by a heat treatment such as a reflow treatment. Furthermore, there is also observed a phenomenon in which whiskers that may cause an electric short circuit accident are generated even though the material has been subjected to a reflow treatment. Such phenomena are thought to be caused because, for example, Sn present on the rectangular wire material melts and flows during the reflow treatment and the distribution of Sn becomes non-uniform. However, the Patent Literature 1 does not have any descriptions at all on the case where the base material is a rectangular wire material, and in order to solve this problem, a new approach will be needed.

Thus, it is an object of the present invention to provide a metallic material for a connecting part which has good surface properties after a heat treatment and has good solderability in subsequent processes, and to provide a method for producing the metallic material.

It is another object of the present invention to provide a metallic material for a connecting part which material has good surface properties after a heat treatment and hardly causes whiskers, and a method for producing the metallic material.

Solution to Problem

According to the present invention, there is provided the following means:

(1) A metallic material for a connecting part, having a rectangular wire material of copper or a copper alloy as a base material, and formed at an outermost surface thereof, a copper-tin alloy layer substantially composed of copper and tin, wherein the copper-tin alloy layer of the outermost surface further contains at least one selected from the group consisting of zinc, indium, antimony, gallium, lead, bismuth, cadmium, magnesium, silver, gold and aluminum, in a total amount of 0.01% or more and 1% or less in terms of mass ratio with respect to the content of the tin;

(2) A metallic material for a connecting part, having a rectangular wire material of copper or a copper alloy as a base material, and formed at an outermost surface thereof, an alloy layer containing tin as a main component, wherein the alloy layer containing tin as a main component at the outermost surface contains an element selected from at least one group among the following two groups of (A) and (B), in a total amount of 0.01% by mass or more and 2% by mass or less:

(A) at least one element selected from the group consisting of gallium, indium, lead, bismuth, cadmium, magnesium, zinc, sliver, and gold is contained, in an amount of 0.01% by mass or more and 1% by mass or less for individual element, and (B) at least one element selected from the group consisting of aluminum and copper is contained, in an amount of 0.01 to 0.5% by mass for individual element;

(3) The metallic material for a connecting part as described in the above item (1) or (2), wherein a layer of nickel, cobalt, iron, or an alloy thereof is formed on the base material;

(4) A method for producing a metallic material for a connecting part, the method including: providing a rectangular wire material of copper or a copper alloy as a base material, forming on this base material a tin alloy plating layer containing at least one selected from the group consisting of zinc, indium, antimony, gallium, lead, bismuth, cadmium, magnesium, silver, gold, copper and aluminum, in a total amount of 0.01% by mass or more and 1% by mass or less, to thereby obtain an intermediate material; subsequently subjecting the intermediate material to a heat treatment, and thereby forming an alloy layer containing copper and tin at the outermost surface;

(5) The method for producing a metallic material for a connecting part as described in the above item (4), wherein the thickness of the tin alloy plating layer prior to the heat treatment is 0.3 to 0.8 μm;

(6) The method for producing a metallic material for a connecting part as described in the above item (4), wherein a layer of nickel, cobalt, iron, or an alloy thereof, and a copper plating layer or a copper alloy plating layer are provided, in order from the side closer to the base material, between the base material and the tin alloy plating layer, and thereby the intermediate material is obtained;

(7) The method for producing a metallic material for a connecting part as described in the above item (6), wherein the thickness of the tin plating layer or the tin alloy plating layer prior to subjecting to the heat treatment is 0.3 to 0.8 μm, and the ratio (Sn thickness/Cu thickness) of the thickness of the tin plating or tin alloy plating layer (Sn thickness) to the thickness of the copper plating layer (Cu thickness) is less than 2;

(8) A method for producing a metallic material for a connecting part, the method including: providing a rectangular wire material of copper or a copper alloy as a base material, forming on this base material a tin alloy plating layer containing an element selected from at least one group among the following two groups (A) and (B), in a total amount of 0.01% by mass or more and 2% by mass or less, to thereby obtain an intermediate material; and then subjecting the intermediate material to a heat treatment:

(A) at least one element selected from the group consisting of gallium, indium, lead, bismuth, cadmium, magnesium, zinc, sliver, and gold is contained, in an amount of 0.01% by mass or more and 1% by mass or less for individual element, and (B) at least one element selected from the group consisting of aluminum and copper is contained, in an amount of 0.01 to 0.5% by mass for individual element;

(9) The method for producing a metallic material for a connecting part as described in the above item (8), wherein the thickness of the tin alloy plating layer prior to the heat treatment is 0.8 to 1.2 μm;

(10) The method for producing a metallic material for a connecting part as described in the above item (8), wherein a layer of nickel, cobalt, iron or an alloy thereof, and a copper plating layer or a copper alloy plating layer are provided, in order from the side closer to the base material, between the base material and the tin alloy plating layer, and thereby the intermediate material is obtained;

(11) The method for producing a metallic material for a connecting part as described in the above item (10), wherein the thickness of the tin plating layer or the tin alloy plating layer prior to subjecting to the heat treatment is 0.8 to 1.2 μm, and the ratio (Sn thickness/Cu thickness) of the thickness of the tin plating or tin alloy plating layer (Sn thickness) to the thickness of the copper plating layer (Cu thickness) is 2 or more; and

(12) The method for producing a metallic material for a connecting part as described in any one of items (4) to (11), wherein the heat treatment is a reflow treatment.

Hereinafter, a first embodiment of the present invention means to include the material for a connecting part, as described in the items (1) and (3) {limited to those dependent on the item (1)}, and the method for producing a metallic material for a connecting part, as described in the items (4) to (7), and (12) {limited to those directly or indirectly dependent on the item (4)}.

A second embodiment of the present invention means to include the metallic material for a connecting part, as described in (2) and (3) {limited to the one dependent on the item (2)} and the method for producing a metallic material for a connecting part, as described in (8) to (11), and (12) {limited to the one directly or indirectly dependent on the item (8)}.

Herein, the present invention means to include all of the above first and second embodiments, unless otherwise specified.

ADVANTAGEOUS EFFECTS OF INVENTION

The metallic material for a connecting part of the present invention, which has, at the outermost surface of a rectangular wire material (including a rectangular rod material) of copper and a copper alloy as a base material, a layer substantially composed of copper and tin and containing at least one selected from the group consisting of zinc, indium, antimony, gallium, lead, bismuth, cadmium, magnesium, silver, gold, and aluminum, in a total amount of 0.01% or more and 1% or less in terms of mass ratio with respect to the content of tin, can serve as a metallic material that is independent of surface unevenness of the base material surface, has sufficient gloss after a heat treatment, and has very high preliminary solderability and post-plating property for the promotion of wetting by solder.

The metallic material for a connecting part of the present invention, which has, at the outermost surface of a rectangular wire material (including a rectangular rod material) of copper or a copper alloy as a base material, a layer containing tin as a main component and further containing an element selected from at least one group among the following two groups of (A) and (B) in a total amount of 0.01% by mass or more and 2% by mass or less, can serve as a metallic material that is independent of surface unevenness of the base material surface, has sufficient gloss after a heat treatment, and does not easily have the occurrence of whiskers;

(A) at least one element selected from the group consisting of gallium, indium, lead, bismuth, cadmium, magnesium, zinc, sliver, and gold is contained, in an amount of 0.01% by mass or more and 1% by mass or less for individual element;

(B) at least one element selected from the group consisting of aluminum and copper is contained, in an amount of 0.01 to 0.5% by mass for individual element.

Other and further features and advantages of the invention will appear more fully from the following description, appropriately referring to the accompanying drawings.

BRIEF DESCRIPTION OF THE DRAWINGS

FIG. 1 is a partially enlarged schematic cross-sectional view of a metallic material for a connecting part (rectangular wire material) of Example 1.

FIG. 2 is a partially enlarged schematic cross-sectional view of a metallic material for a connecting part (rectangular wire material) of Example 2.

FIG. 3 is a partially enlarged schematic cross-sectional view of a metallic material for a connecting part (rectangular wire material) of Example 3.

FIG. 4 is a partially enlarged schematic cross-sectional view of a metallic material for a connecting part (rectangular wire material) of Example 4.

FIG. 5 is a partially enlarged schematic cross-sectional view of a metallic material for a connecting part (rectangular wire material) of Example 5.

FIG. 6 is a partially enlarged schematic cross-sectional view of a metallic material for a connecting part (rectangular wire material) of Example 6.

FIG. 7 is a partially enlarged schematic cross-sectional view of a metallic material for a connecting part (rectangular wire material) of Example 7.

1 Base material
2 Copper-tin alloy layer
3 Nickel layer
11 Base material
12 Tin alloy layer
13 Copper-tin alloy layer
14 Nickel layer

BEST MODE FOR CARRYING OUT THE INVENTION

The metallic material for a connecting part according to a preferred embodiment (the "first embodiment") of the present invention has a rectangular wire material formed of copper or a copper alloy as a base material, and has, at the outermost surface thereof, a layer substantially composed of copper and tin and further containing at least one selected from the group consisting of zinc (Zn), indium (In), antimony (Sb), gallium (Ga), lead (Pb), bismuth (Bi), cadmium (Cd), magnesium (Mg), silver (Ag), gold (Au), and aluminum (Al), in a total amount of 0.01% or more and 1% or less in terms of mass ratio with respect to the content of tin.

The metallic material for a connecting part of another preferred embodiment (the "second embodiment") of the present invention has a rectangular wire material formed of copper or a copper alloy as a base material, and has, at the outermost surface thereof, a layer containing tin as a main component and further containing an element selected from at least one group among the following two groups of (A) and (B), in a total amount of 0.01% by mass or more and 2% by mass or less;

(A) at least one element selected from the group consisting of Ga, In, Pb, Bi, Cd, Mg, Zn, Ag, and Au is contained, in an amount of 0.01% by mass or more and 1% by mass or less for individual element;

(B) at least one element selected from the group consisting of Al and Cu is contained in an amount of 0.01 to 0.5% by mass for individual element.

As the base material for the metallic material for a connecting part, of the present invention, copper or a copper alloy is used, and use may be preferably made of copper and copper alloys, such as phosphor bronze, brass, nickel silver, beryllium copper, and Corson alloy, each of which has the electroconductivity, mechanical strength, and heat resistance required in connectors.

The shape of the base material is preferably a rectangular wire material (including a rectangular rod material). For the rectangular wire material, the cross-sectional shape may be any of square, rectangle, and regular hexagon, or may be an irregularly shaped wire. A rectangular wire material having an approximately square cross-sectional shape can be used with preference in the present invention.

According to the present invention, it is preferable to provide a Cu plating layer by performing Cu underlying plating on the rectangular wire material. However, in the case of adopting a constitution capable of forming a layer of a copper-tin alloy below the tin alloy plating of the outermost layer by a heat treatment that will be described later, the metallic material may not have a underlying. When a Cu plating layer is provided, the formation of an alloy layer containing Cu and Sn can be easily achieved. The thickness of the Cu plating layer is preferably 0.01 to 3.0 μm, and more preferably 0.05 to 1.0 μm.

Further, in order to enhance heat resistance, a nickel plating layer may be formed, by providing a nickel (Ni) underlying plating having a barrier property that prevents the diffusion of metal from the lower layer, between the base material and the copper underlying. The nickel underlying plating may be a Ni alloy plating, such as a Ni—P-based, a Ni—Sn-based, a Co—P-based, a Ni—Co-based, a Ni—Co—P-based, a Ni—Cu-based, a Ni—Cr-based, a Ni—Zn-based, or a Ni—Fe-based. Ni and Ni alloys are not deteriorated in the barrier function even in a high temperature environment. Furthermore, in addition to nickel, since cobalt (Co), iron (Fe) or an alloy thereof also exhibits the same effects, these metals are suitably used as the underlying layer.

When the thickness of the layer formed from nickel, cobalt, iron, or an alloy thereof is less than 0.02 μm, the barrier function is not sufficiently exhibited. When the thickness is greater than 3.0 μm, the plating strain increases, and the plating is apt to be peeled off from the base material. Therefore, the thickness is preferably 0.02 to 3.0 μm. The upper limit of the thickness of the layer formed from nickel, cobalt, iron, or an alloy thereof is preferably 1.5 μm, and more preferably 1.0 μm, taking the terminal processability into consideration.

In the present invention, the surface layer of the material is provided with a tin alloy plating. In the metallic material for a connecting part of the first embodiment, this tin alloy plating contains at least one selected from the group consisting of zinc, indium, antimony, gallium, lead, bismuth, cadmium, magnesium, silver, gold, copper, and aluminum, in a total amount of 0.01% by mass or more and 1% by mass or less. Furthermore, in the metallic material for a connecting part of the second embodiment, this tin alloy plating contains an element selected from at least one group among the following two groups of (A) and (B), in a total amount of 0.01% by mass or more and 2% by mass or less;

(A) at least one element selected from the group consisting of Ga, In, Pb, Bi, Cd, Mg, Zn, Ag, and Au is contained, in an amount of 0.01% by mass or more and 1% by mass or less for individual element;

(B) at least one element selected from the group consisting of Al and Cu is contained, in an amount of 0.01 to 0.5% by mass for individual element.

In the metallic material for a connecting part of the first embodiment, if the thickness of the tin alloy plating is too small, the environment resistance or the like of the copper-tin alloy layer that is finally formed at the outermost surface is hardly exhibited, and therefore, the thickness is preferably 0.3 μm or more. If the thickness of the tin alloy plating is too large, the tin alloy eventually remains on the surface of the copper-tin alloy layer and causes the fretting phenomenon, and therefore, the thickness is more preferably 0.3 to 0.8 μm, and even more preferably 0.3 to 0.6 μm.

In the metallic material for a connecting part of the second embodiment, if the thickness of the tin alloy plating is too small, the heat resistance and environment resistance of tin are hardly exhibited, and therefore, the thickness is preferably 0.3 μm or more, more preferably 0.8 to 1.2 μm, and even more preferably 0.8 to 1.0 μm.

In the present invention, the tin alloy plating may be formed by performing electroless plating, but it is preferable to form the tin alloy plating by performing electroplating.

The Sn electroplating of the surface layer may be performed by, for example, using a tin sulfate bath, at a plating temperature of 30° C. or lower, with a current density of 5 $A/dm^2$. The conditions are not limited thereto and can be appropriately set up.

In the production of the metallic material for a connecting part of the first embodiment, when an underlying copper plating is provided, the ratio (Sn thickness/Cu thickness) of the thickness of the surface tin plating or tin alloy plating layer (Sn thickness) to the thickness of the underlying copper plating layer (Cu thickness) is preferably less than 2, and more preferably equal to or greater than 1.0 and less than 2.0.

Further, in the production of the metallic material for a connecting part of the second embodiment, when an underlying copper plating is provided, the ratio (Sn thickness/Cu thickness) of the thickness of the surface layer tin plating or tin alloy plating layer (Sn thickness) to the thickness of the underlying copper plating layer (Cu thickness) is preferably 2 or greater, and more preferably 2.0 to 3.0.

The metallic material for a connecting part of the present invention is subjected to a heat treatment in the longitudinal direction of the rectangular wire material having a tin alloy plating layer formed at the outermost layer by the plating described above. The heat treatment is not particularly limited as long as it is a method capable of uniformly heating the rectangular wire material, such as a reflow treatment. When the metallic material is subjected to a treatment involving reflow, the time for the heat treatment of the rectangular wire material can be shortened, and thus such an embodiment is preferable.

The metallic material for a connecting part of the present invention can be processed in a usual manner, into various electrical/electronic connectors, including, for example, fitting-type connectors and contacts for automobiles.

In the metallic material for a connecting part of the first embodiment, the copper-tin alloy layer at the outermost surface also contains at least one selected from the group consisting of zinc, indium, antimony, gallium, lead, bismuth, cadmium, magnesium, silver, gold, and aluminum, in a total amount of 0.01% or more and 1% or less, in terms of mass ratio with respect to the content of tin, and therefore, the metallic material can be obtained as a metallic material for a connecting part which material is favorable in both the surface properties after the heat treatment and the solderability in the subsequent processes.

Furthermore, in the metallic material for a connecting part of the second embodiment, the alloy layer at the outermost surface containing copper and tin contains an element selected from at least one group among the following two groups of (A) and (B), in a total amount of 0.01% by mass or more and 2% by mass or less, and therefore, the metallic material can be obtained as a metallic material for a connecting part which material is favorable in the surface properties after the heat treatment and hardly generates whiskers.

(A) at least one element selected from the group consisting of Ga, In, Pb, Bi, Cd, Mg, Zn, Ag, and Au is contained, in an amount of 0.01% by mass or more and 1% by mass or less for individual element.

(B) at least one element selected from the group consisting of Al and Cu is contained, in an amount of 0.01 to 0.5% by mass for individual element.

EXAMPLES

The present invention will be described in more detail based on examples given below, but the invention is not meant to be limited by these.

In the following Examples (Invention Examples) and Comparative Examples, the conditions were as follows.

Base material: A rectangular wire of Corson alloy, in which the shape of the cross-section obtained by taking the longitudinal direction of the rectangular wire as a perpendicular line is a square which measured 0.64 mm on each side (manufactured by Furukawa Electric Co., Ltd., EFTEC-97: hereinafter, the same), was used. Hereinafter, one side of the rectangular wire may be described with the term "width". In regard to the surface roughness, two types of base materials, one with Ra=2.0 μm (indicated as "Ra=large" in the tables) and one with Ra=0.05 μm (indicated as "Ra=small" in the tables), were used.

Plating: Copper plating was carried out using a sulfuric acid bath, nickel plating was carried out using a sulfamic acid bath, and tin alloy plating was carried out using a sulfuric acid bath. Here, the plating was carried out by electroplating.

Tin alloy plating and elements added thereto: A liquid having appropriate amounts of Zn ions, In ions, Cu ions, and Al ions incorporated therein was prepared.

Measurement of concentration of additive element in tin plating: Plating was carried out on a stainless steel, and only the plating coating was dissolved in an acid, and the concentration was determined through an analysis using an ICP emission analyzer.

Heat treatment: The metallic material was subjected to a reflow treatment by heating on a hot plate.

Example 1

A rectangular wire of Corson alloy having a width of 0.64 mm was subjected to tin alloy plating to a thickness of 0.5 μm. Thereafter, the material was subjected to a reflow treatment at 350° C. for 10 seconds, and thus a rectangular wire material as shown in the partially enlarged schematic cross-sectional view of FIG. 1 was obtained. In FIG. 1, a part near the center point of one side of the rectangular wire material is shown in an enlarged view (the same in the following figures). In FIG. 1, the reference numeral 1 denotes a base material, and the reference numeral 2 denotes a copper-tin alloy layer.

Comparative Example 1

A rectangular wire of Corson alloy having a width of 0.64 mm was subjected to tin alloy plating to a thickness of 0.5 μm. The amount of the additional elements in the tin alloy plating was selected such that the amount does not fall in the range of Example 1. Thereafter, the material was subjected to a reflow treatment at 350° C. for 10 seconds, and thus the rectangular wire material as shown in the partially enlarged schematic cross-sectional view of FIG. 1 was obtained.

Example 2

A rectangular wire of Corson alloy having a width of 0.64 mm was subjected to copper plating to a thickness of 0.3 μm, and then was subjected to tin alloy plating to a thickness of 0.5 μm. Thereafter, the material was subjected to a reflow treatment at 500° C. for 5 seconds, and thus a rectangular wire material as shown in the partially enlarged schematic cross-sectional view of FIG. 2 was obtained. In FIG. 2, the reference numeral 1 denotes a base material, and the reference numeral 2 denotes a copper-tin alloy layer. The copper plating layer had completely reacted with the tin alloy plating of the outermost layer, by the reflow treatment, and converted to a copper-tin alloy layer 2.

Comparative Example 2

A rectangular wire of Corson alloy having a width of 0.64 mm was subjected to copper plating to a thickness of 0.3 μm, and then was subjected to tin alloy plating to a thickness of 0.5 μm. The amount of the additional elements in the tin alloy plating was selected such that the amount does not fall in the range of Example 2. Thereafter, the material was subjected to a reflow treatment at 350° C. for 10 seconds, and thus a rectangular wire material as shown in the partially enlarged schematic cross-sectional view of FIG. 2 was obtained. The copper plating layer had completely reacted with the tin alloy plating of the outermost layer, by the reflow treatment, and converted to a copper-tin alloy layer 2.

Example 3

A rectangular wire of Corson alloy having a width of 0.64 mm was subjected to nickel plating to a thickness of 0.4 μm, subsequently subjected to copper plating to a thickness of 0.3 μm, and then subjected to tin alloy plating to a thickness of 0.5 μm. Thereafter, the material was subjected to a reflow treatment at 500° C. for 5 seconds, and thus a rectangular wire material as shown in the partially enlarged schematic cross-sectional view of FIG. 3 was obtained. In FIG. 3, the reference numeral 1 denotes a base material, the reference numeral 2 denotes a copper-tin alloy layer, and the reference numeral 3 denotes a nickel layer. The copper plating layer had completely reacted with the tin alloy plating of the outermost layer, by the reflow treatment, and converted to a copper-tin alloy layer 2.

Comparative Example 3

A rectangular wire of Corson alloy having a width of 0.64 mm was subjected to nickel plating to a thickness of 0.4 μm, subsequently subjected to copper plating to a thickness of 0.3 μm, and then subjected to tin alloy plating to a thickness of 0.5 μm. The amount of the additional elements in the tin alloy plating was selected such that the amount does not fall in the range of Example 3. Thereafter, the material was subjected to a reflow treatment at 350° C. for 10 seconds, and thus a rectangular wire material as shown in the partially enlarged schematic cross-sectional view of FIG. 3 was obtained. The copper plating layer had completely reacted with the tin alloy plating of the outermost layer, by the reflow treatment, and converted to a copper-tin alloy layer 2.

Test Example 1

The rectangular wire materials of Examples 1 to 3 and Comparative Examples 1 to 3 were subjected to evaluation tests on contact resistance, solder wettability, and surface gloss. The results are respectively presented in Tables 1-1 to 1-2 for Example 1 and Comparative Example 1, in Tables 2-1 to 2-2 for Example 2 and Comparative Example 2, and in Tables 3-1 to 3-2 for Example 3 and Comparative Example 3.

(Contact Resistance)

The contact resistance was measured according to a four-terminal method. An Ag probe was used for a contact, and the measurement was made under a load of 1 N.

A contact resistance of 2 mΩ or less was designated to as good ○○, a contact resistance of 5 mΩ or less was designated to as acceptable (passed the test) ○, and a higher contact resistance was designated to as unacceptable ×.

(Solder Wettability)

The solder wettability was measured according to a meniscograph method.

Solder Checker SAT-5100, manufactured by Rhesca Corp., was used for the apparatus.

A flux composed of 25% of rosin and the remainder of isopropyl alcohol was applied on the surface of a rectangular wire, and then the rectangular wire was immersed in a Sn-3.0Ag-0.5Cu lead-free solder bath maintained at 260° C. The rectangular wire was maintained in the bath for 3 seconds and then was pulled out.

The determination criteria were as follows: good ○○ when 95% or more of the immersed area was wet; acceptable ○ when 90% or more of the immersed area was wet; and unacceptable × when the wet area was less than that.

(Surface Gloss)

The surface gloss was examined by visual inspection. A rectangular wire having uniform gloss without any unevenness was rated as ○○; a rectangular wire having slight dullness but having a gloss sufficient as a product, without any unevenness, was rated as ○; and a rectangular wire having insufficient gloss or having unevenness was rated as ×.

TABLE 1-1

| No. | Zn in plating (mass %) | Cu in plating (mass %) | Underlying plating | Contact resistance | Solderability | Gloss Ra = large | Gloss Ra = small | Remarks |
|---|---|---|---|---|---|---|---|---|
| 101 | 0 | 0.1 | Not formed | ○ | ○ | ○ | ○○ | Example |
| 102 | 0 | 0.01 | Not formed | ○ | ○ | ○ | ○○ | according to |
| 103 | 0.1 | 0 | Not formed | ○ | ○ | ○ | ○○ | this invention |
| 104 | 0.01 | 0 | Not formed | ○ | ○ | ○ | ○○ | |
| 105 | 1 | 0 | Not formed | ○ | ○ | ○ | ○○ | |
| 106 | 0.1 | 0.1 | Not formed | ○ | ○ | ○ | ○○ | |
| 107 | 0.01 | 0.01 | Not formed | ○ | ○ | ○ | ○○ | |
| 111 | 0 | 1 | Not formed | ○ | x | ○ | ○○ | Comparative |
| 112 | 0 | 0.001 | Not formed | ○ | ○ | x | x | Example |

TABLE 1-1-continued

| No. | Zn in plating (mass %) | Cu in plating (mass %) | Underlying plating | Contact resistance | Solderability | Gloss Ra = large | Gloss Ra = small | Remarks |
|---|---|---|---|---|---|---|---|---|
| 113 | 0.001 | 0 | Not formed | ○ | ○ | x | x | |
| 114 | 1 | 1 | Not formed | x | ○ | ○ | ○○ | |
| 115 | 0.001 | 0.001 | Not formed | ○ | ○ | x | x | |
| 116 | 0 | 0 | Not formed | ○ | ○ | x | x | |

TABLE 1-2

| No. | In in plating (mass %) | Cu in plating (mass %) | Underlying plating | Contact resistance | Solderability | Gloss Ra = large | Gloss Ra = small | Remarks |
|---|---|---|---|---|---|---|---|---|
| 103I | 0.1 | 0 | Not formed | ○ | ○○ | ○ | ○○ | Example |
| 104I | 0.01 | 0 | Not formed | ○ | ○ | ○ | ○○ | according to this |
| 105I | 1 | 0 | Not formed | ○ | ○○ | ○ | ○○ | invention |
| 106I | 0.1 | 0.1 | Not formed | ○ | ○○ | ○ | ○○ | |
| 107I | 0.01 | 0.01 | Not formed | ○ | ○ | ○ | ○○ | |
| 113I | 0.001 | 0 | Not formed | ○ | ○ | x | x | Comparative |
| 114I | 1 | 1 | Not formed | x | ○○ | ○ | ○○ | Example |
| 115I | 0.001 | 0.001 | Not formed | ○ | ○ | x | x | |

As shown in Tables 1-1 and 1-2, the samples of No. 101 to 107 and No. 103I to 107I of Example 1 all satisfied the criteria for all of the items of the contact resistance, the solderability, and the surface gloss. Thus, the samples were suitable as a metallic material for a connecting part such as a connector. On the contrary, the samples of No. 111 to 116 and No. 113I to 115I of Comparative Example 1 were unacceptable in at least one item among the contact resistance, the solderability, and the surface gloss.

TABLE 2-1

| No. | Zn in plating (mass %) | Cu in plating (mass %) | Underlying plating | Contact Resistance | Solderability | Gloss Ra = large | Gloss Ra = small | Remarks |
|---|---|---|---|---|---|---|---|---|
| 201 | 0 | 0.1 | 0.3 μm Cu | ○ | ○ | ○○ | ○○ | Example |
| 202 | 0 | 0.01 | 0.3 μm Cu | ○ | ○ | ○○ | ○○ | according to |
| 203 | 0.1 | 0 | 0.3 μm Cu | ○ | ○ | ○○ | ○○ | this |
| 204 | 0.01 | 0 | 0.3 μm Cu | ○ | ○ | ○○ | ○○ | invention |
| 205 | 1 | 0 | 0.3 μm Cu | ○ | ○ | ○○ | ○○ | |
| 206 | 0.1 | 0.1 | 0.3 μm Cu | ○ | ○ | ○○ | ○○ | |
| 207 | 0.01 | 0.01 | 0.3 μm Cu | ○ | ○ | ○○ | ○○ | |
| 211 | 0 | 1 | 0.3 μm Cu | ○ | x | ○○ | ○○ | Comparative |
| 212 | 0 | 0.001 | 0.3 μm Cu | ○ | ○ | x | ○ | example |
| 213 | 0.001 | 0 | 0.3 μm Cu | ○ | ○ | x | ○ | |
| 214 | 1 | 1 | 0.3 μm Cu | x | ○ | ○○ | ○○ | |
| 215 | 0.001 | 0.001 | 0.3 μm Cu | ○ | ○ | x | ○ | |
| 216 | 0 | 0 | 0.3 μm Cu | ○ | ○ | x | ○ | |

TABLE 2-2

| No. | In in plating (mass %) | Cu in plating (mass %) | Underlying plating | Contact resistance | Solderability | Gloss Ra = large | Gloss Ra = small | Remarks |
|---|---|---|---|---|---|---|---|---|
| 203I | 0.1 | 0 | 0.3 μm Cu | ○ | ○○ | ○○ | ○○ | Example |
| 204I | 0.01 | 0 | 0.3 μm Cu | ○ | ○ | ○○ | ○○ | according to |
| 205I | 1 | 0 | 0.3 μm Cu | ○ | ○○ | ○○ | ○○ | this |
| 206I | 0.1 | 0.1 | 0.3 μm Cu | ○ | ○○ | ○○ | ○○ | invention |
| 207I | 0.01 | 0.01 | 0.3 μm Cu | ○ | ○ | ○○ | ○○ | |
| 213I | 0.001 | 0 | 0.3 μm Cu | ○ | ○ | x | ○ | Comparative |

TABLE 2-2-continued

| No. | In in plating (mass %) | Cu in plating (mass %) | Underlying plating | Contact resistance | Solderability | Gloss Ra = large | Gloss Ra = small | Remarks |
|---|---|---|---|---|---|---|---|---|
| 214I | 1 | 1 | 0.3 μm Cu | x | ○○ | ○○ | ○○ | example |
| 215I | 0.001 | 0.001 | 0.3 μm Cu | ○ | ○ | x | ○ | |

As shown in Tables 2-1 and 2-2, the samples of Nos. 201 to 207 and Nos. 203I to 207I of Example 2 all satisfied the criteria for all of the items of the contact resistance, the solderability, and the surface gloss. Thus, the samples were suitable as a metallic material for a connecting part such as a connector. On the contrary, the samples of Nos. 211 to 216 and Nos. 213I to 215I of Comparative Example 2 were unacceptable in at least one item among the contact resistance, the solderability, and the surface gloss.

TABLE 3-1

| No. | Zn in plating (mass %) | Cu in plating (mass %) | Underlying plating: Base material side | Underlying plating: Outermost layer side | Contact resistance | Solderability | Gloss Ra = large | Gloss Ra = small | Remarks |
|---|---|---|---|---|---|---|---|---|---|
| 301 | 0 | 0.1 | 0.4 μm Ni | 0.3 μm Cu | ○ | ○ | ○○ | ○○ | Example |
| 302 | 0 | 0.01 | 0.4 μm Ni | 0.3 μm Cu | ○ | ○ | ○○ | ○○ | according to |
| 303 | 0.1 | 0 | 0.4 μm Ni | 0.3 μm Cu | ○ | ○ | ○○ | ○○ | this invention |
| 304 | 0.01 | 0 | 0.4 μm Ni | 0.3 μm Cu | ○ | ○ | ○○ | ○○ | |
| 305 | 1 | 0 | 0.4 μm Ni | 0.3 μm Cu | ○ | ○ | ○○ | ○○ | |
| 306 | 0.1 | 0.1 | 0.4 μm Ni | 0.3 μm Cu | ○ | ○ | ○○ | ○○ | |
| 307 | 0.01 | 0.01 | 0.4 μm Ni | 0.3 μm Cu | ○ | ○ | ○○ | ○○ | |
| 311 | 0 | 1 | 0.4 μm Ni | 0.3 μm Cu | ○ | x | ○○ | ○○ | Comparative |
| 312 | 0 | 0.001 | 0.4 μm Ni | 0.3 μm Cu | ○ | ○ | x | ○ | Example |
| 313 | 0.001 | 0 | 0.4 μm Ni | 0.3 μm Cu | ○ | ○ | x | ○ | |
| 314 | 1 | 1 | 0.4 μm Ni | 0.3 μm Cu | x | ○ | ○○ | ○○ | |
| 315 | 0.001 | 0.001 | 0.4 μm Ni | 0.3 μm Cu | ○ | ○ | x | ○ | |
| 316 | 0 | 0 | 0.4 μm Ni | 0.3 μm Cu | ○ | ○ | x | ○ | |

TABLE 3-2

| No. | In in plating (mass %) | Cu in plating (mass %) | Underlying plating: Base material side | Underlying plating: Outermost layer side | Contact resistance | Solderability | Gloss Ra = large | Gloss Ra = small | Remarks |
|---|---|---|---|---|---|---|---|---|---|
| 303I | 0.1 | 0 | 0.4 μm Ni | 0.3 μm Cu | ○ | ○○ | ○○ | ○○ | Example |
| 304I | 0.01 | 0 | 0.4 μm Ni | 0.3 μm Cu | ○ | ○ | ○○ | ○○ | according to |
| 305I | 1 | 0 | 0.4 μm Ni | 0.3 μm Cu | ○ | ○○ | ○○ | ○○ | this |
| 306I | 0.1 | 0.1 | 0.4 μm Ni | 0.3 μm Cu | ○ | ○○ | ○○ | ○○ | invention |
| 307I | 0.01 | 0.01 | 0.4 μm Ni | 0.3 μm Cu | ○ | ○ | ○○ | ○○ | |
| 313I | 0.001 | 0 | 0.4 μm Ni | 0.3 μm Cu | ○ | ○ | x | ○ | Comparative |
| 314I | 1 | 1 | 0.4 μm Ni | 0.3 μm Cu | x | ○○ | ○○ | ○ | example |
| 315I | 0.001 | 0.001 | 0.4 μm Ni | 0.3 μm Cu | ○ | ○ | x | ○ | |

As shown in Tables 3-1 and 3-2, the samples of Nos. 301 to 307 and Nos. 303I to 307I of Example 2 all satisfied the criteria for all the items of the contact resistance, the solderability, and the surface gloss. Thus, the samples were suitable as a metallic material for a connecting part such as a connector. On the contrary, the samples of Nos. 311 to 316 and Nos. 313I to 315I of Comparative Example 3 were unacceptable in at least one item among the contact resistance, the solderability, and the surface gloss.

Example 4

A rectangular wire of Corson alloy having a width of 0.64 mm was subjected to tin alloy plating to a thickness of 0.9 μm. Thereafter, the material was subjected to a reflow treatment at 350° C. for 10 seconds, and thus a rectangular wire material as shown in the partially enlarged schematic cross-sectional view of FIG. 4 was obtained. In FIG. 4, a part near the center point of one side of the rectangular wire material is shown in an enlarged view (the same in the following figures). In FIG. 4, the reference numeral 11 denotes a base material, the reference numeral 12 denotes a tin alloy plating layer, and the reference numeral 13 denotes a copper-tin alloy layer.

Comparative Example 4

A rectangular wire of Corson alloy having a width of 0.64 mm was subjected to tin alloy plating to a thickness of 0.9 μm. The amount of the additional elements in the tin alloy plating was selected such that the amount does not fall in the range of Example 4. Thereafter, the material was subjected to a reflow treatment at 350° C. for 10 seconds, and thus a rectangular wire material as shown in the partially enlarged schematic cross-sectional view of FIG. 4 was obtained.

Example 5

A rectangular wire of Corson alloy having a width of 0.64 mm was subjected to copper plating to a thickness of 0.3 μm, and then was subjected to tin alloy plating to a thickness of 0.9 μm. Thereafter, the material was subjected to a reflow treatment at 500° C. for 5 seconds, and thus a rectangular wire material as shown in the partially enlarged schematic cross-sectional view of FIG. 5 was obtained. In FIG. 5, the reference numeral 11 denotes a base material, the reference numeral 12 denotes a tin alloy plating layer, and the reference numeral 13 denotes a copper-tin alloy layer. The copper plating layer had completely reacted with the tin alloy plating of the outermost layer, by the reflow treatment, and converted to a copper-tin alloy layer 13.

Comparative Example 5

A rectangular wire of Corson alloy having a width of 0.64 mm was subjected to copper plating to a thickness of 0.3 μm, and then was subjected to tin alloy plating to a thickness of 0.9 μm. The amount of the additional elements in the tin alloy plating was selected such that the amount does not fall in the range of Example 5. Thereafter, the material was subjected to a reflow treatment at 350° C. for 10 seconds, and thus a rectangular wire material as shown in the partially enlarged schematic cross-sectional view of FIG. 5 was obtained. The copper plating layer had completely reacted with the tin alloy plating of the outermost layer, by the reflow treatment, and converted to a copper-tin alloy layer 13.

Example 6

A rectangular wire of Corson alloy having a width of 0.64 mm was subjected to nickel plating to a thickness of 0.4 μm, and then subjected to tin alloy plating to a thickness of 0.9 μm. Thereafter, the material was subjected to a reflow treatment at 350° C. for 10 seconds, and thus a rectangular wire material as shown in the partially enlarged schematic cross-sectional view of FIG. 6 was obtained. In FIG. 6, the reference numeral 11 denotes a base material, the reference numeral 12 denotes a tin alloy plating layer, and the reference numeral 14 denotes a nickel layer.

Comparative Example 6

A rectangular wire of Corson alloy having a width of 0.64 mm was subjected to nickel plating to a thickness of 0.4 μm, and then subjected to tin alloy plating to a thickness of 0.9 μm. The amount of the additional elements in the tin alloy plating was selected such that the amount does not fall in the range of Example 6. Thereafter, the material was subjected to a reflow treatment at 350° C. for 10 seconds, and thus a rectangular wire material as shown in the partially enlarged schematic cross-sectional view of FIG. 6 was obtained.

Example 7

A rectangular wire of Corson alloy having a width of 0.64 mm was subjected to nickel plating to a thickness of 0.4 μm, subsequently subjected to copper plating to a thickness of 0.3 μm, and then subjected to tin alloy plating to a thickness of 0.9 μm. Thereafter, the material was subjected to a reflow treatment at 500° C. for 5 seconds, and thus a rectangular wire material as shown in the partially enlarged schematic cross-sectional view of FIG. 7 was obtained. In FIG. 7, the reference numeral 11 denotes a base material, the reference numeral 12 denotes a tin alloy plating layer, the reference numeral 13 denotes a copper-tin alloy layer, and the reference numeral 14 denotes a nickel layer. The copper plating layer had completely reacted with the tin alloy plating of the outermost layer, by the reflow treatment, and converted to a copper-tin alloy layer 13.

Comparative Example 7

A rectangular wire of Corson alloy having a width of 0.64 mm was subjected to nickel plating to a thickness of 0.4 μm, subsequently subjected to copper plating to a thickness of 0.3 μm, and then subjected to tin alloy plating to a thickness of 0.9 μm. The amount of the additional elements in the tin alloy plating was selected such that the amount does not fall in the range of Example. Thereafter, the material was subjected to a reflow treatment at 350° C. for 10 seconds, and thus a rectangular wire material as shown in the partially enlarged schematic cross-sectional view of FIG. 7 was obtained. The copper plating layer had completely reacted with the tin alloy plating of the outermost layer, by the reflow treatment, and converted to a copper-tin alloy layer 13.

Test Example 2

The rectangular wire materials of Examples 4 to 7 and Comparative Examples 4 to 7 were subjected to evaluation tests on surface gloss, whisker preventing property, and contact resistance. The results are respectively presented in Tables 4-1 to 4-4 for Example 4 and Comparative Example 4, in Tables 5-1 to 5-4 for Example 5 and Comparative Example 5, in Tables 6-1 to 6-4 for Example 6 and Comparative Example 6, and in Tables 7-1 to 7-4 for Example 7 and Comparative Example 7.

(Surface Gloss)

The surface gloss was examined by visual inspection. A rectangular wire having uniform gloss without any unevenness was rated as ○○; a rectangular wire having slight dullness but having a gloss sufficient as a product, without any unevenness, was rated as ○; and a rectangular wire having insufficient gloss or having unevenness was rated as ×.

(Whisker Preventing Property)

A rectangular wire was left to stand for three months while an external stress was exerted to the rectangular wire by an indenter, and the presence or absence of the generation of whiskers was investigated. A rectangular wire which did not generate whiskers or which generated whiskers having a length of 50 μm or less, was rated as ○; and a rectangular wire which generated whiskers having a length of greater than 50 μm was rated as ×.

(Contact Resistance)

Common to all samples: A sample was exposed to an atmosphere at 120° C. for 120 hours, and then the contact resistance was measured. The measurement was made according to a four-terminal method, under a load of 1 N, using an Ag probe as a contact.

A contact resistance of 2 mΩ or less was designated as good ○○; a contact resistance of 5 mΩ or less was designated as acceptable ○; and a contact resistance higher than that was designated as unacceptable ×.

Example 6, Comparative Example 6, Example 7, and Comparative Example 7: With a method for measurement conducted in the same manner as the method after heating at 120° C. for 120 hours, the contact resistance obtained after exposure to an atmosphere at 160° C. for 120 hours was also measured.

TABLE 4-1

| No. | Cu in outermost layer (mass %) | Zn in outermost layer (mass %) | Underlying plating | Gloss Ra = large | Gloss Ra = small | Contact resistance after heating | Whisker preventing property | Remarks |
|---|---|---|---|---|---|---|---|---|
| 401 | 0.1 | 0 | Not formed | ○ | ○○ | ○ | ○ | Example according to this invention |
| 402 | 0.01 | 0 | Not formed | ○ | ○○ | ○ | ○ | |
| 403 | 0 | 0.1 | Not formed | ○ | ○○ | ○ | ○ | |
| 404 | 0 | 0.01 | Not formed | ○ | ○○ | ○ | ○ | |
| 405 | 0.1 | 0.1 | Not formed | ○ | ○○ | ○ | ○ | |
| 406 | 0.01 | 0.01 | Not formed | ○ | ○○ | ○ | ○ | |
| 411 | 1 | 0 | Not formed | ○ | ○○ | ○ | x | Comparative example |
| 412 | 0.001 | 0 | Not formed | x | x | ○ | ○ | |
| 413 | 0 | 1 | Not formed | ○ | ○○ | x | ○ | |
| 414 | 0 | 0.001 | Not formed | x | x | ○ | ○ | |
| 415 | 1 | 1 | Not formed | ○ | ○○ | x | ○ | |
| 416 | 0.001 | 0.001 | Not formed | x | x | ○ | ○ | |
| 417 | 0 | 0 | Not formed | x | x | ○ | ○ | |

TABLE 4-2

| No. | Cu in outermost layer (mass %) | In in outermost layer (mass %) | Underlying plating | Gloss Ra = large | Gloss Ra = small | Contact resistance after heating | Whisker preventing property | Remarks |
|---|---|---|---|---|---|---|---|---|
| 403I | 0 | 0.1 | Not formed | ○ | ○○ | ○○ | ○ | Example according to this invention |
| 404I | 0 | 0.01 | Not formed | ○ | ○○ | ○ | ○ | |
| 405I | 0.1 | 0.1 | Not formed | ○ | ○○ | ○○ | ○ | |
| 406I | 0.01 | 0.01 | Not formed | ○ | ○○ | ○ | ○ | |
| 413I | 0 | 1 | Not formed | ○ | ○○ | ○ | x | Comparative example |
| 414I | 0 | 0.001 | Not formed | x | x | ○ | ○ | |
| 415I | 1 | 1 | Not formed | ○ | ○○ | x | ○ | |
| 416I | 0.001 | 0.001 | Not formed | x | x | ○ | ○ | |

TABLE 4-3

| No. | Al in outermost layer (mass %) | Zn in outermost layer (mass %) | Underlying plating | Gloss Ra = large | Gloss Ra = small | Contact resistance after heating | Whisker preventing property | Remarks |
|---|---|---|---|---|---|---|---|---|
| 401AZ | 0.1 | 0 | Not formed | ○ | ○○ | ○ | ○ | Example according to this invention |
| 402AZ | 0.01 | 0 | Not formed | ○ | ○○ | ○ | ○ | |
| 405AZ | 0.1 | 0.1 | Not formed | ○ | ○○ | ○ | ○ | |
| 406AZ | 0.01 | 0.01 | Not formed | ○ | ○○ | ○ | ○ | |
| 411AZ | 1 | 0 | Not formed | ○ | ○○ | x | ○ | Comparative example |
| 412AZ | 0.001 | 0 | Not formed | x | x | ○ | ○ | |
| 415AZ | 1 | 1 | Not formed | ○ | ○○ | x | ○ | |
| 416AZ | 0.001 | 0.001 | Not formed | x | x | ○ | ○ | |

TABLE 4-4

| No. | Al in outermost layer (mass %) | In in outermost layer (mass %) | Underlying plating | Gloss Ra = large | Gloss Ra = small | Contact resistance after heating | Whisker preventing property | Remarks |
|---|---|---|---|---|---|---|---|---|
| 405AI | 0.1 | 0.1 | Not formed | ○○ | ○○ | ○ | ○ | Example according to this invention |
| 406AI | 0.01 | 0.01 | Not formed | ○ | ○○ | ○ | ○ | |
| 415AI | 1 | 1 | Not formed | ○ | ○○ | x | ○ | Comparative example |
| 416AI | 0.001 | 0.001 | Not formed | x | x | ○ | ○ | |

As shown in Tables 4-1 to 4-4, the samples of Nos. 401 to 406, Nos. 403I to 406I, Nos. 401AZ to 402AZ, Nos. 405AZ to 406AZ, and Nos. 405AI to 406AI of Example 4 all satisfied the criteria for all of the items of the surface gloss, the whisker preventing property, and the contact resistance. Thus, the samples were suitable as a metallic material for a connecting part such as a connector. On the contrary, the samples of Nos. 411 to 417, Nos. 413I to 416I, Nos. 411AZ to 412AZ, Nos. 415AZ to 416AZ, and Nos. 415AI to 416AI of Comparative Example 4 were unacceptable in at least one of the surface gloss, the whisker preventing property, and the contact resistance.

TABLE 5-1

| No. | Cu in outermost layer (mass %) | Zn in outermost layer (mass %) | Underlying plating | Gloss Ra = large | Gloss Ra = small | Contact resistance after heating | Whisker preventing property | Remarks |
|---|---|---|---|---|---|---|---|---|
| 501 | 0.1 | 0 | 0.3 μm Cu | ○○ | ○○ | ○ | ○ | Exmple |
| 502 | 0.01 | 0 | 0.3 μm Cu | ○○ | ○○ | ○ | ○ | according to |
| 503 | 0 | 0.1 | 0.3 μm Cu | ○○ | ○○ | ○ | ○ | this |
| 504 | 0 | 0.01 | 0.3 μm Cu | ○○ | ○○ | ○ | ○ | invention |
| 505 | 0.1 | 0.1 | 0.3 μm Cu | ○○ | ○○ | ○ | ○ | |
| 506 | 0.01 | 0.01 | 0.3 μm Cu | ○○ | ○○ | ○ | ○ | |
| 511 | 1 | 0 | 0.3 μm Cu | ○○ | ○○ | ○ | x | Comparative |
| 512 | 0.001 | 0 | 0.3 μm Cu | x | ○ | ○ | ○ | example |
| 513 | 0 | 1 | 0.3 μm Cu | ○○ | ○○ | x | ○ | |
| 514 | 0 | 0.001 | 0.3 μm Cu | x | ○ | ○ | ○ | |
| 515 | 1 | 1 | 0.3 μm Cu | ○○ | ○○ | x | ○ | |
| 516 | 0.001 | 0.001 | 0.3 μm Cu | x | ○ | ○ | ○ | |
| 517 | 0 | 0 | 0.3 μm Cu | x | ○ | ○ | ○ | |

TABLE 5-2

| No. | Cu in outermost layer (mass %) | In in outermost layer (mass %) | Underlying plating | Gloss Ra = large | Gloss Ra = small | Contact resistance after heating | Whisker preventing property | Remarks |
|---|---|---|---|---|---|---|---|---|
| 503I | 0 | 0.1 | 0.3 μm Cu | ○○ | ○○ | ○○ | ○ | Example |
| 504I | 0 | 0.01 | 0.3 μm Cu | ○○ | ○○ | ○ | ○ | according to |
| 505I | 0.1 | 0.1 | 0.3 μm Cu | ○○ | ○○ | ○○ | ○ | this |
| 506I | 0.01 | 0.01 | 0.3 μm Cu | ○○ | ○○ | ○ | ○ | invention |
| 513I | 0 | 1 | 0.3 μm Cu | ○○ | ○○ | ○ | x | Comparative |
| 514I | 0 | 0.001 | 0.3 μm Cu | x | ○ | ○ | ○ | example |
| 515I | 1 | 1 | 0.3 μm Cu | ○○ | ○○ | x | ○ | |
| 516I | 0.001 | 0.001 | 0.3 μm Cu | x | ○ | ○ | ○ | |

TABLE 5-3

| No. | Al in outermost layer (mass %) | Zn in outermost layer (mass %) | Underlying plating | Gloss Ra = large | Gloss Ra = small | Contact resistance after heating | Whisker preventing property | Remarks |
|---|---|---|---|---|---|---|---|---|
| 501AZ | 0.1 | 0 | 0.3 μm Cu | ○○ | ○○ | ○ | ○ | Example |
| 502AZ | 0.01 | 0 | 0.3 μm Cu | ○○ | ○○ | ○ | ○ | according to |
| 505AZ | 0.1 | 0.1 | 0.3 μm Cu | ○○ | ○○ | ○ | ○ | this |
| 506AZ | 0.01 | 0.01 | 0.3 μm Cu | ○○ | ○○ | ○ | ○ | invention |
| 511AZ | 1 | 0 | 0.3 μm Cu | ○○ | ○○ | x | ○ | Comparative |
| 512AZ | 0.001 | 0 | 0.3 μm Cu | x | ○ | ○ | ○ | example |
| 515AZ | 1 | 1 | 0.3 μm Cu | ○○ | ○○ | x | ○ | |
| 516AZ | 0.001 | 0.001 | 0.3 μm Cu | x | ○ | ○ | ○ | |

TABLE 5-4

| No. | Al in outermost layer (mass %) | In in outermost layer (mass %) | Underlying plating | Gloss Ra = large | Gloss Ra = small | Contact resistance after heating | Whisker preventing property | Remarks |
|---|---|---|---|---|---|---|---|---|
| 505AI | 0.1 | 0.1 | 0.3 μm Cu | ○○ | ○○ | ○○ | ○ | Example according |
| 506AI | 0.01 | 0.01 | 0.3 μm Cu | ○○ | ○○ | ○ | ○ | to this invention |

TABLE 5-4-continued

| No. | Al in outermost layer (mass %) | In in outermost layer (mass %) | Underlying plating | Gloss Ra = large | Gloss Ra = small | Contact resistance after heating | Whisker preventing property | Remarks |
|---|---|---|---|---|---|---|---|---|
| 515AI | 1 | 1 | 0.3 μm Cu | ○○ | ○○ | x | ○ | Comparative |
| 516AI | 0.001 | 0.001 | 0.3 μm Cu | x | ○ | ○ | ○ | example |

As shown in Tables 5-1 to 5-4, the samples of Nos. 501 to 506, Nos. 503I to 506I, Nos. 501AZ to 502AZ, Nos. 505AZ to 506AZ, and Nos. 505AI to 506AI of Example 5 all satisfied the criteria for all of the items of the surface gloss, the whisker preventing property, and the contact resistance. Thus, the samples were suitable as a metallic material for a connecting part such as a connector. On the contrary, the samples of Nos. 511 to 517, Nos. 513I to 516I, Nos. 511AZ to 512AZ, Nos. 515AZ to 516AZ, and Nos. 515AI to 516AI of Comparative Example 5 were unacceptable in at least one of the surface gloss, the whisker preventing property, and the contact resistance.

TABLE 6-1

| No. | Cu in outermost layer (mass %) | Zn in outermost layer (mass %) | Underlying plating | Gloss Ra = large | Gloss Ra = small | Contact resistance after heating 120° C. | Contact resistance after heating 160° C. | Whisker preventing property | Remarks |
|---|---|---|---|---|---|---|---|---|---|
| 601 | 0.1 | 0 | 0.4 μm Ni | ○○ | ○○ | ○ | ○ | ○ | Example |
| 602 | 0.01 | 0 | 0.4 μm Ni | ○○ | ○○ | ○ | ○ | ○ | according to |
| 603 | 0 | 0.1 | 0.4 μm Ni | ○○ | ○○ | ○ | ○ | ○ | this invention |
| 604 | 0 | 0.01 | 0.4 μm Ni | ○○ | ○○ | ○ | ○ | ○ | |
| 605 | 0.1 | 0.1 | 0.4 μm Ni | ○○ | ○○ | ○ | ○ | ○ | |
| 606 | 0.01 | 0.01 | 0.4 μm Ni | ○○ | ○○ | ○ | ○ | ○ | |
| 611 | 1 | 0 | 0.4 μm Ni | ○○ | ○○ | ○ | ○ | x | Comparative |
| 612 | 0.001 | 0 | 0.4 μm Ni | x | ○ | ○ | ○ | ○ | example |
| 613 | 0 | 1 | 0.4 μm Ni | ○○ | ○○ | x | x | ○ | |
| 614 | 0 | 0.001 | 0.4 μm Ni | x | ○ | ○ | ○ | ○ | |
| 615 | 1 | 1 | 0.4 μm Ni | ○○ | ○○ | x | x | ○ | |
| 616 | 0.001 | 0.001 | 0.4 μm Ni | x | ○ | ○ | ○ | ○ | |
| 617 | 0 | 0 | 0.4 μm Ni | x | ○ | ○ | ○ | ○ | |

TABLE 6-2

| No. | Cu in outermost layer (mass %) | In in outermost layer (mass %) | Underlying plating | Gloss Ra = large | Gloss Ra = small | Contact resistance after heating 120° C. | Contact resistance after heating 160° C. | Whisker preventing property | Remarks |
|---|---|---|---|---|---|---|---|---|---|
| 603I | 0 | 0.1 | 0.4 μm Ni | ○○ | ○○ | ○○ | ○ | ○ | Example |
| 604I | 0 | 0.01 | 0.4 μm Ni | ○○ | ○○ | ○ | ○ | ○ | according to |
| 605I | 0.1 | 0.1 | 0.4 μm Ni | ○○ | ○○ | ○○ | ○ | ○ | this |
| 606I | 0.01 | 0.01 | 0.4 μm Ni | ○○ | ○○ | ○ | ○ | ○ | invention |
| 613I | 0 | 1 | 0.4 μm Ni | ○○ | ○○ | ○ | ○ | x | Comparative |
| 614I | 0 | 0.001 | 0.4 μm Ni | x | ○ | ○ | ○ | ○ | example |
| 615I | 1 | 1 | 0.4 μm Ni | ○○ | ○○ | x | x | ○ | |
| 6161 | 0.001 | 0.001 | 0.4 μm Ni | x | ○ | ○ | ○ | ○ | |

TABLE 6-3

| No. | Al in outermost layer (mass %) | Zn in outermost layer (mass %) | Underlying plating | Gloss Ra = large | Gloss Ra = small | Contact resistance after heating 120° C. | Contact resistance after heating 160° C. | Whisker preventing property | Remarks |
|---|---|---|---|---|---|---|---|---|---|
| 601AZ | 0.1 | 0 | 0.4 μm Ni | ○○ | ○○ | ○ | ○ | ○ | Example |
| 602AZ | 0.01 | 0 | 0.4 μm Ni | ○○ | ○○ | ○ | ○ | ○ | according to |
| 605AZ | 0.1 | 0.1 | 0.4 μm Ni | ○○ | ○○ | ○ | ○ | ○ | this invention |
| 606AZ | 0.01 | 0.01 | 0.4 μm Ni | ○○ | ○○ | ○ | ○ | ○ | |
| 611AZ | 1 | 0 | 0.4 μm Ni | ○○ | ○○ | x | x | ○ | Comparative |
| 612AZ | 0.001 | 0 | 0.4 μm Ni | x | ○ | ○ | ○ | ○ | example |

TABLE 6-3-continued

| No. | Al in outermost layer (mass %) | Zn in outermost layer (mass %) | Underlying plating | Gloss Ra = large | Gloss Ra = small | Contact resistance after heating 120° C. | Contact resistance after heating 160° C. | Whisker preventing property | Remarks |
|---|---|---|---|---|---|---|---|---|---|
| 615AZ | 1 | 1 | 0.4 µm Ni | ○○ | ○○ | x | x | ○ | |
| 616AZ | 0.001 | 0.001 | 0.4 µm Ni | x | ○ | ○ | ○ | ○ | |

TABLE 6-4

| No. | Al in outermost layer (mass %) | In in outermost layer (mass %) | Underlying plating | Gloss Ra = large | Gloss Ra = small | Contact resistance after heating 120° C. | Contact resistance after heating 160° C. | Whisker preventing property | Remarks |
|---|---|---|---|---|---|---|---|---|---|
| 605AI | 0.1 | 0.1 | 0.4 µm Ni | ○○ | ○○ | ○○ | ○ | ○ | Example according to this invention |
| 606AI | 0.01 | 0.01 | 0.4 µm Ni | ○○ | ○○ | ○ | ○ | ○ | |
| 615AI | 1 | 1 | 0.4 µm Ni | ○○ | ○○ | x | x | ○ | Comparative example |
| 616AI | 0.001 | 0.001 | 0.4 µm Ni | x | ○ | ○ | ○ | ○ | |

As shown in Tables 6-1 to 6-4, the samples of Nos. 601 to 606, Nos. 603I to 606I, Nos. 601AZ to 602AZ, Nos. 605AZ to 606AZ, and Nos. 605AI to 606AI of Example 6 all satisfied the criteria for all of the items of the surface gloss, the whisker preventing property, and the contact resistance. Thus, the samples were suitable as a metallic material for a connecting part such as a connector. On the contrary, the samples of Nos. 611 to 617, Nos. 613I to 616I, Nos. 611AZ to 612AZ, Nos. 615AZ to 616AZ, and Nos. 615AI to 616AI of Comparative Example 6 were unacceptable in at least one of the surface gloss, the whisker preventing property, and the contact resistance.

TABLE 7-1

| No. | Cu in outermost layer (mass %) | Zn in outermost layer (mass %) | Underlying plating Base material side | Underlying plating Outermost layer side | Gloss Ra = large | Gloss Ra = small | Contact resistance after heating 120° C. | Contact resistance after heating 160° C. | Whisker preventing property | Remarks |
|---|---|---|---|---|---|---|---|---|---|---|
| 701 | 0.1 | 0 | 0.4 µm Ni | 0.3 µm Cu | ○○ | ○○ | ○ | ○ | ○ | Example according to this invention |
| 702 | 0.01 | 0 | 0.4 µm Ni | 0.3 µm Cu | ○○ | ○○ | ○ | ○ | ○ | |
| 703 | 0 | 0.1 | 0.4 µm Ni | 0.3 µm Cu | ○○ | ○○ | ○ | ○ | ○ | |
| 704 | 0 | 0.01 | 0.4 µm Ni | 0.3 µm Cu | ○○ | ○○ | ○ | ○ | ○ | |
| 705 | 0.1 | 0.1 | 0.4 µm Ni | 0.3 µm Cu | ○○ | ○○ | ○ | ○ | ○ | |
| 706 | 0.01 | 0.01 | 0.4 µm Ni | 0.3 µm Cu | ○○ | ○○ | ○ | ○ | ○ | |
| 711 | 1 | 0 | 0.4 µm Ni | 0.3 µm Cu | ○○ | ○○ | ○ | ○ | x | Comparative example |
| 712 | 0.001 | 0 | 0.4 µm Ni | 0.3 µm Cu | x | ○ | ○ | ○ | ○ | |
| 713 | 0 | 1 | 0.4 µm Ni | 0.3 µm Cu | ○○ | ○○ | x | x | ○ | |
| 714 | 0 | 0.001 | 0.4 µm Ni | 0.3 µm Cu | x | ○ | ○ | ○ | ○ | |
| 715 | 1 | 1 | 0.4 µm Ni | 0.3 µm Cu | ○○ | ○○ | x | x | ○ | |
| 716 | 0.001 | 0.001 | 0.4 µm Ni | 0.3 µm Cu | x | ○ | ○ | ○ | ○ | |
| 717 | 0 | 0 | 0.4 µm Ni | 0.3 µm Cu | x | ○ | ○ | ○ | ○ | |

TABLE 7-2

| No. | Cu in outermost layer (mass %) | In in outermost layer (mass %) | Underlying plating Base material side | Underlying plating Outermost layer side | Gloss Ra = large | Gloss Ra = small | Contact resistance after heating 120° C. | Contact resistance after heating 160° C. | Whisker preventing property | Remarks |
|---|---|---|---|---|---|---|---|---|---|---|
| 703I | 0 | 0.1 | 0.4 µm Ni | 0.3 µm Cu | ○○ | ○○ | ○○ | ○ | ○ | Example according to this invention |
| 704I | 0 | 0.01 | 0.4 µm Ni | 0.3 µm Cu | ○○ | ○○ | ○ | ○ | ○ | |
| 705I | 0.1 | 0.1 | 0.4 µm Ni | 0.3 µm Cu | ○○ | ○○ | ○○ | ○ | ○ | |

TABLE 7-2-continued

| No. | Cu in outermost layer (mass %) | In in outermost layer (mass %) | Underlying plating: Base material side | Underlying plating: Outermost layer side | Gloss: Ra = large | Gloss: Ra = small | Contact resistance after heating: 120° C. | Contact resistance after heating: 160° C. | Whisker preventing property | Remarks |
|---|---|---|---|---|---|---|---|---|---|---|
| 706I | 0.01 | 0.01 | 0.4 μm Ni | 0.3 μm Cu | ○○ | ○○ | ○ | ○ | ○ | |
| 713I | 0 | 1 | 0.4 μm Ni | 0.3 μm Cu | ○○ | ○○ | ○ | ○ | x | Comparative example |
| 714I | 0 | 0.001 | 0.4 μm Ni | 0.3 μm Cu | x | ○ | ○ | ○ | ○ | |
| 715I | 1 | 1 | 0.4 μm Ni | 0.3 μm Cu | ○○ | ○○ | x | x | ○ | |
| 716I | 0.001 | 0.001 | 0.4 μm Ni | 0.3 μm Cu | x | ○ | ○ | ○ | ○ | |

TABLE 7-3

| No. | Al in outermost layer (mass %) | Zn in outermost layer (mass %) | Underlying plating: Base material side | Underlying plating: Outermost layer side | Gloss: Ra = large | Gloss: Ra = small | Contact resistance after heating: 120° C. | Contact resistance after heating: 160° C. | Whisker preventing property | Remarks |
|---|---|---|---|---|---|---|---|---|---|---|
| 701AZ | 0.1 | 0 | 0.4 μm Ni | 0.3 μm Cu | ○○ | ○○ | ○ | ○ | ○ | Example according to this invention |
| 702AZ | 0.01 | 0 | 0.4 μm Ni | 0.3 μm Cu | ○○ | ○○ | ○ | ○ | ○ | |
| 705AZ | 0.1 | 0.1 | 0.4 μm Ni | 0.3 μm Cu | ○○ | ○○ | ○ | ○ | ○ | |
| 706AZ | 0.01 | 0.01 | 0.4 μm Ni | 0.3 μm Cu | ○○ | ○○ | ○ | ○ | ○ | |
| 711AZ | 1 | 0 | 0.4 μm Ni | 0.3 μm Cu | ○○ | ○○ | x | x | ○ | Comparative example |
| 712AZ | 0.001 | 0 | 0.4 μm Ni | 0.3 μm Cu | x | ○ | ○ | ○ | ○ | |
| 715AZ | 1 | 1 | 0.4 μm Ni | 0.3 μm Cu | ○○ | ○○ | x | x | ○ | |
| 716AZ | 0.001 | 0.001 | 0.4 μm Ni | 0.3 μm Cu | x | ○ | ○ | ○ | ○ | |

TABLE 7-4

| No. | Al in outermost layer (mass %) | In in outermost layer (mass %) | Underlying plating: Base material side | Underlying plating: Outermost layer side | Gloss: Ra = large | Gloss: Ra = small | Contact resistance after heating: 120° C. | Contact resistance after heating: 160° C. | Whisker preventing property | Remarks |
|---|---|---|---|---|---|---|---|---|---|---|
| 705AI | 0.1 | 0.1 | 0.4 μm Ni | 0.3 μm Cu | ○○ | ○○ | ○○ | ○ | ○ | Example according to this invention |
| 706AI | 0.01 | 0.01 | 0.4 μm Ni | 0.3 μm Cu | ○○ | ○○ | ○ | ○ | ○ | |
| 715AI | 1 | 1 | 0.4 μm Ni | 0.3 μm Cu | ○○ | ○○ | x | x | ○ | Comparative example |
| 716AI | 0.001 | 0.001 | 0.4 μm Ni | 0.3 μm Cu | x | ○ | ○ | ○ | ○ | |

As shown in Tables 7-1 to 7-4, the samples of Nos. 701 to 706, Nos. 703I to 706I, Nos. 701AZ to 702AZ, Nos. 705AZ to 706AZ, and Nos. 705AI to 706AI of Example 7 all satisfied the criteria for all of the items of the surface gloss, the whisker preventing property, and the contact resistance. Thus, the samples were suitable as a metallic material for a connecting part such as connectors. On the contrary, the samples of Nos. 711 to 717, Nos. 713I to 716I, Nos. 711AZ to 712AZ, Nos. 715AZ to 716AZ, and Nos. 715AI to 716AI of Comparative Example 7 were unacceptable in at least one of the surface gloss, the whisker preventing property, and the contact resistance.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2008-092053 filed in Japan on Mar. 31, 2008, and Patent Application No. 2008-092054 filed in Japan on Mar. 31, 2008, each of which is entirely herein incorporated by reference.

The invention claimed is:

1. A metallic material for a connecting part, having a rectangular wire material of copper or a copper alloy and having a square cross-section as a base material, and formed at an outermost surface thereof, a copper-tin alloy layer consisting essentially of copper and tin, and at least one element selected from the group consisting of zinc, indium, and aluminum, in a total amount of 0.01% or more and 1% or less in terms of mass ratio with respect to the content of the tin; and wherein a layer of nickel, cobalt, iron, or an alloy thereof is formed on the base material.

2. A connector comprising the metallic material according to claim 1.

3. The connector according to claim 2, wherein the connector is a male terminal.

4. A metallic material for a connecting part, having a rectangular wire material of copper or a copper alloy and having a square cross-section as a base material, and formed at an outermost surface thereof, an alloy layer containing tin as a main component, wherein the alloy layer containing tin as a main component at the outermost surface contains an element selected from at least one group among the following two groups of (A) and (B), in a total amount of 0.01% by mass or more and 2% by mass or less:

(A) at least one element selected from the group consisting of indium, and zinc is contained, in an amount of 0.01% by mass or more and 1% by mass or less for individual element, and (B) at least one element selected from the group consisting of aluminum and copper is contained, in an amount of 0.01 to 0.5% by mass for individual element; and wherein a layer of nickel, cobalt, iron, or an alloy thereof is formed on the base material.

5. A connector comprising the metallic material according to claim 4.

6. The connector according to claim 5, wherein the connector is a male terminal.

7. A method for producing a metallic material for a connecting part, the method including:

providing a rectangular wire material of copper or a copper alloy and having a square cross-section as a base material;

forming on this base material, in order from a side closer to the base material, a layer of nickel, cobalt, iron, or an alloy thereof, a copper plating layer or a copper alloy plating layer, and a tin alloy plating layer containing at least one element selected from the group consisting of zinc, indium, and aluminum, in a total amount of 0.01% by mass or more and 1% by mass or less, to thereby obtain an intermediate material; and subsequently subjecting the intermediate material to a heat treatment, and thereby forming an alloy layer containing copper and tin at the outermost surface.

8. The method for producing a metallic material for a connecting part according to claim 7, wherein the heat treatment is a reflow treatment.

9. The method for producing a metallic material for a connecting part according to claim 7, wherein the thickness of the tin alloy plating layer prior to the heat treatment is 0.3 to 0.8 μm.

10. The method for producing a metallic material for a connecting part according to claim 7, wherein the heat treatment is a reflow treatment.

11. The method for producing a metallic material for a connecting part according to claim 7, wherein the thickness of the tin alloy plating layer prior to subjecting to the heat treatment is 0.3 to 0.8 μm, and the ratio (Sn thickness/Cu thickness) of the thickness of the tin plating or tin alloy plating layer (Sn thickness) to the thickness of the copper plating layer (Cu thickness) is less than 2.

12. The method for producing a metallic material for a connecting part according to claim 11, wherein the heat treatment is a reflow treatment.

13. The method according to claim 7, wherein the tin alloy plating layer is formed by performing electroless plating or electroplating.

14. A method for producing a metallic material for a connecting part, the method including:

providing a rectangular wire material of copper or a copper alloy and having a square cross-section as a base material, forming on this base material, in order from a side closer to the base material, a layer of nickel, cobalt, iron or an alloy thereof, a copper plating layer or a copper alloy plating layer, and a tin alloy plating layer containing an element selected from at least one group among the following two groups (A) and (B), in a total amount of 0.01% by mass or more and 2% by mass or less, to thereby obtain an intermediate material; and then subjecting the intermediate material to a heat treatment thereby forming an alloy layer containing tin as a main component at the outermost surface:

(A) at least one element selected from the group consisting of indium, and zinc is contained, in an amount of 0.01% by mass or more and 1% by mass or less for individual element, and (B) at least one element selected from the group consisting of aluminum and copper is contained, in an amount of 0.01 to 0.5% by mass for individual element.

15. The method for producing a metallic material for a connecting part according to claim 14, wherein the heat treatment is a reflow treatment.

16. The method for producing a metallic material for a connecting part according to claim 14, wherein the thickness of the tin alloy plating layer prior to the heat treatment is 0.8 to 1.2 μm.

17. The method for producing a metallic material for a connecting part according to claim 16, wherein the heat treatment is a reflow treatment.

18. The method for producing a metallic material for a connecting part according to claim 14, wherein the thickness of the tin alloy plating layer prior to subjecting to the heat treatment is 0.8 to 1.2 μm, and the ratio (Sn thickness/Cu thickness) of the thickness of the tin plating or tin alloy plating layer (Sn thickness) to the thickness of the copper plating layer (Cu thickness) is 2 or more.

19. The method for producing a metallic material for a connecting part according to claim 18, wherein the heat treatment is a reflow treatment.

20. The method according to claim 14, wherein the tin alloy plating layer is formed by performing electroless plating or electroplating.

* * * * *